(12) United States Patent
Ozias et al.

(10) Patent No.: US 6,563,698 B1
(45) Date of Patent: May 13, 2003

(54) SYSTEM AND METHOD FOR PROVIDING A COMPUTER SYSTEM WITH A DETACHABLE COMPONENT

(75) Inventors: Orin M. Ozias, Cedar Park; Thomas L. Bentley, Austin, both of TX (US); David H. Titzler; Thijs J. Gerlings, both of Palo Alto, CA (US); Lawrence E. Davis, San Francisco, CA (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/413,557

(22) Filed: Oct. 6, 1999

(51) Int. Cl.[7] .............................................. G06F 1/16
(52) U.S. Cl. ..................... 361/683; 361/725; 361/759; 312/216
(58) Field of Search ................................. 361/683, 724, 361/725, 726, 727, 686, 740, 759; 364/708.1; 248/551–553; 312/216, 218; 70/57, 58, 85; 292/42, 148, 151, 307 R

(56) References Cited

U.S. PATENT DOCUMENTS

| | | | |
|---|---|---|---|
| 4,253,178 A | 2/1981 | Kolaczia | 368/285 |
| 4,356,545 A | 10/1982 | West | 364/200 |
| 4,438,458 A | 3/1984 | Munscher | 358/254 |
| 4,491,914 A | 1/1985 | Sujaku | 364/200 |
| 4,627,060 A | 12/1986 | Huang et al. | 371/62 |
| 4,635,187 A | 1/1987 | Baron et al. | 364/200 |
| 4,788,658 A | 11/1988 | Hanebuth | 364/900 |
| 4,809,280 A | 2/1989 | Shonaka | 371/62 |
| 4,916,699 A | 4/1990 | Ohashi | 364/900 |
| 4,964,077 A | 10/1990 | Eisen et al. | 364/900 |
| 5,010,551 A | 4/1991 | Goldsmith et al. | 371/16.4 |
| 5,017,030 A | 5/1991 | Crews | 400/485 |
| 5,060,135 A | 10/1991 | Levine et al. | 364/200 |
| 5,196,993 A | * 3/1993 | Herron et al. | 361/393 |
| 5,214,695 A | 5/1993 | Arnold et al. | 380/4 |

(List continued on next page.)

FOREIGN PATENT DOCUMENTS

| | | | |
|---|---|---|---|
| GB | 2329266 | 3/1999 | G06F/11/00 |
| GB | 2356271 | 5/2001 | G06F/11/00 |
| WO | WO 93/00628 | 1/1993 | G06F/1/24 |
| WO | WO 94/08289 | 4/1994 | G06F/9/445 |
| WO | WO 97/09676 | 3/1997 | |
| WO | WO 98/18086 | 4/1998 | G06F/17/30 |

OTHER PUBLICATIONS

Pending Patent Application Serial No. 09/236,862: Alan E. Beelitz, Richard D. Amberg; "Recoverable Software Installation Process and Apparatus for a Computer System"; Dell USA, L.P., Filed Jan. 25, 1999.

Pending Patent Application 09/245,148: Jeffrey N. Sloan, Tim Sullivan, David S. Springer, "Method and Apparatus for Diagnosing and Conveying an Identification Code in Post on a Non–Booting Personal Computer"; Dell USA, L.P., Filed Feb. 4, 1999.

(List continued on next page.)

Primary Examiner—Darren Schuberg
Assistant Examiner—Hung Van Duong
(74) Attorney, Agent, or Firm—Baker Botts L.L.P.

(57) ABSTRACT

A system and method for providing one or more detachable components for a computer system are disclosed. The system and method allow for simplified customization of a user's computer system. A system incorporating teachings of the present disclosure may include a housing component at least partially defining an exterior surface of the computer system. The housing component may have at least one mounting finger, which may be a pin like protrusion or an elongated and flat extension. The mounting finger may extend from the housing component and be formed to define a locking shoulder. The system may also include a detachable component having a mounting tab. The mounting tab may interact with the locking shoulder to releasably couple the detachable component to the housing component.

46 Claims, 2 Drawing Sheets

U.S. PATENT DOCUMENTS

| | | | |
|---|---|---|---|
| 5,224,024 A | 6/1993 | Tu et al. ................... 364/429 |
| 5,228,655 A | 7/1993 | Garcia et al. ............. 248/118 |
| 5,276,805 A | 1/1994 | Hamaguchi ................ 395/164 |
| 5,287,448 A | 2/1994 | Nicol et al. ................ 395/159 |
| 5,287,505 A | 2/1994 | Calvert et al. ............. 395/600 |
| 5,325,521 A | 6/1994 | Koyama et al. ........... 375/575 |
| 5,346,410 A | 9/1994 | Moore, Jr. .................. 439/607 |
| 5,348,408 A | 9/1994 | Gelardi et al. ............. 400/715 |
| 5,353,240 A | 10/1994 | Mallory et al. ............. 364/552 |
| 5,355,357 A | 10/1994 | Yamamori et al. ......... 369/75.2 |
| 5,356,099 A | 10/1994 | Sereboff .................. 248/118.1 |
| 5,367,667 A | 11/1994 | Wahlquist et al. .......... 395/575 |
| 5,374,018 A | 12/1994 | Daneshvar ................. 248/118 |
| 5,375,800 A | 12/1994 | Wilcox et al. ........... 248/118.1 |
| 5,381,526 A | 1/1995 | Ellson ........................ 395/164 |
| 5,388,032 A | 2/1995 | Gill et al. ................... 364/146 |
| 5,390,324 A | 2/1995 | Burckhartt et al. ......... 395/575 |
| 5,392,095 A | 2/1995 | Siegel ......................... 355/200 |
| 5,398,333 A | 3/1995 | Schieve et al. ............. 395/575 |
| 5,410,447 A * | 4/1995 | Miyagawa et al. ......... 361/681 |
| 5,422,751 A | 6/1995 | Lewis et al. .................. 359/83 |
| 5,423,605 A | 6/1995 | Liu ........................... 312/265.6 |
| 5,432,927 A | 7/1995 | Grote et al. ................ 395/575 |
| 5,443,237 A | 8/1995 | Stadtmauer ............. 248/441.1 |
| 5,450,576 A | 9/1995 | Kennedy .................... 395/650 |
| 5,454,080 A | 9/1995 | Fasig et al. ................. 395/283 |
| 5,455,933 A | 10/1995 | Schieve et al. ........ 395/183.03 |
| 5,471,674 A | 11/1995 | Stewart et al. ............. 395/650 |
| 5,483,437 A | 1/1996 | Tang .......................... 363/146 |
| 5,503,484 A | 4/1996 | Louis ......................... 400/489 |
| 5,513,319 A | 4/1996 | Finch et al. ........... 395/185.08 |
| 5,522,572 A | 6/1996 | Copeland et al. ........... 248/118 |
| 5,526,180 A | 6/1996 | Rausnitz .................... 359/609 |
| 5,530,847 A | 6/1996 | Schieve et al. ........ 395/183.14 |
| 5,537,585 A | 7/1996 | Blickenstaff et al. ....... 395/600 |
| 5,537,618 A | 7/1996 | Boulton et al. ............. 395/161 |
| 5,547,154 A | 8/1996 | Kirchoff et al. ......... 248/118.3 |
| 5,547,272 A | 8/1996 | Paterson et al. ......... 312/223.2 |
| 5,564,054 A | 10/1996 | Bramnick et al. .......... 395/700 |
| 5,592,362 A | 1/1997 | Ohgami et al. ............. 361/686 |
| 5,596,481 A | 1/1997 | Liu et al. .................... 361/683 |
| 5,596,482 A | 1/1997 | Horikoshi .................. 361/683 |
| 5,627,964 A | 5/1997 | Reynolds et al. ...... 395/183.22 |
| 5,649,200 A | 7/1997 | Leblang et al. ............. 717/122 |
| 5,668,992 A | 9/1997 | Hammer et al. ............ 395/651 |
| 5,678,002 A | 10/1997 | Fawcett et al. ............. 395/575 |
| 5,680,640 A | 10/1997 | Ofek et al. ................. 395/839 |
| 5,689,253 A | 11/1997 | Hargreaves et al. .......... 341/22 |
| 5,689,706 A | 11/1997 | Rao et al. ................... 395/617 |
| 5,694,293 A | 12/1997 | Seto et al. .................. 361/687 |
| 5,708,776 A | 1/1998 | Kikinis .................. 395/185.08 |
| 5,708,812 A | 1/1998 | Van Dyke et al. .......... 395/712 |
| 5,724,224 A | 3/1998 | Howell et al. .............. 361/680 |
| 5,727,163 A | 3/1998 | Bezos ........................ 395/227 |
| 5,732,268 A | 3/1998 | Bizzarri ..................... 395/652 |
| 5,748,877 A | 5/1998 | Dollahite et al. ....... 395/183.12 |
| 5,759,644 A | 6/1998 | Stanley ........................ 428/14 |
| 5,768,370 A | 6/1998 | Maatta et al. ............... 379/433 |
| 5,775,822 A | 7/1998 | Cheng ........................ 400/489 |
| 5,778,372 A | 7/1998 | Cordell et al. ............. 707/100 |
| 5,790,796 A | 8/1998 | Sadowsky .............. 395/200.51 |
| 5,796,579 A * | 8/1998 | Nakajima et al. ........... 361/683 |
| 5,797,281 A | 8/1998 | Fox .............................. 63/12 |
| 5,803,416 A | 9/1998 | Hanson et al. ............. 248/118 |
| 5,805,882 A | 9/1998 | Cooper et al. .............. 395/652 |
| 5,809,248 A | 9/1998 | Vidovic ................. 395/200.49 |
| 5,809,511 A | 9/1998 | Peake ........................ 707/204 |
| 5,818,635 A | 10/1998 | Hohn et al. ................. 359/612 |
| 5,819,274 A | 10/1998 | Jackson, Jr. .................. 707/10 |
| 5,825,355 A | 10/1998 | Palmer et al. ............. 345/336 |
| 5,825,506 A | 10/1998 | Bednar et al. .............. 358/402 |
| 5,826,839 A | 10/1998 | Chen ........................... 248/118 |
| 5,832,522 A | 11/1998 | Blickenstaff et al. ....... 707/204 |
| 5,835,344 A | 11/1998 | Alexander .................. 361/683 |
| 5,845,136 A | 12/1998 | Babcock ................ 395/750.01 |
| 5,852,545 A | 12/1998 | Pan-Ratzlaff ............... 361/683 |
| 5,854,828 A | 12/1998 | Kocis et al. ............. 379/93.31 |
| 5,860,001 A | 1/1999 | Cromer et al. .............. 395/651 |
| 5,860,002 A | 1/1999 | Huang ........................ 395/652 |
| 5,860,012 A | 1/1999 | Luu ............................ 395/712 |
| 5,861,884 A | 1/1999 | Fujioka ...................... 345/338 |
| 5,881,236 A | 3/1999 | Dickey .................. 395/200.51 |
| 5,884,073 A | 3/1999 | Dent ........................... 395/652 |
| 5,894,571 A | 4/1999 | O'Connor ................... 395/652 |
| 5,904,327 A | 5/1999 | Cheng .................... 248/118.1 |
| 5,905,632 A | 5/1999 | Seto et al. .................. 361/683 |
| 5,906,506 A | 5/1999 | Chang et al. ............... 439/500 |
| 5,909,544 A | 6/1999 | Anderson, II et al. .. 395/200.38 |
| 5,939,694 A | 8/1999 | Holcomb et al. ........... 235/381 |
| 5,953,533 A | 9/1999 | Fink et al. .................. 395/712 |
| 5,955,797 A | 9/1999 | Kim ........................... 307/150 |
| 5,960,189 A | 9/1999 | Stupek, Jr. et al. ..... 395/500.43 |
| 5,960,204 A | 9/1999 | Yinger et al. ............... 395/712 |
| 5,960,411 A | 9/1999 | Hartman et al. ............. 705/26 |
| 5,963,743 A | 10/1999 | Amberg et al. ............. 395/712 |
| 5,974,546 A | 10/1999 | Anderson ...................... 713/2 |
| 5,978,911 A | 11/1999 | Knox et al. .................... 713/1 |
| 5,983,369 A | 11/1999 | Bakoglu et al. ............... 714/46 |
| 5,991,543 A | 11/1999 | Amberg et al. ............. 395/712 |
| 5,995,757 A | 11/1999 | Amberg et al. ............. 395/712 |
| 6,006,344 A | 12/1999 | Bell, Jr. ........................ 714/37 |
| 6,012,154 A | 1/2000 | Poisner ........................ 714/55 |
| 6,014,744 A | 1/2000 | McKaughan et al. .......... 713/2 |
| 6,023,267 A | 2/2000 | Chapuis et al. ............. 345/327 |
| 6,029,257 A | 2/2000 | Palmer ......................... 714/40 |
| 6,029,258 A | 2/2000 | Ahmad ......................... 714/46 |
| 6,032,157 A | 2/2000 | Tamano et al. ............. 707/104 |
| 6,034,869 A * | 3/2000 | Lin ............................. 361/686 |
| 6,038,597 A | 3/2000 | Van Wyngarden .......... 709/219 |
| 6,047,261 A | 4/2000 | Siefert ......................... 705/11 |
| 6,049,342 A | 4/2000 | Nielsen et al. .............. 345/473 |
| 6,049,454 A * | 4/2000 | Howell et al. .............. 361/686 |
| 6,050,833 A | 4/2000 | Danzyger et al. ............. 439/92 |
| 6,056,136 A | 5/2000 | Taber et al. ................. 215/252 |
| 6,061,788 A | 5/2000 | Reynaud et al. ............... 713/2 |
| 6,061,810 A | 5/2000 | Potter .......................... 714/23 |
| 6,104,874 A | 8/2000 | Branson et al. ............. 395/702 |
| 6,108,697 A | 8/2000 | Raymond et al. ........... 709/218 |
| 6,112,320 A | 8/2000 | Dien ............................ 714/51 |
| 6,113,050 A | 9/2000 | Rush ....................... 248/346.01 |
| 6,166,729 A | 12/2000 | Acosta et al. ............... 345/327 |
| 6,167,383 A | 12/2000 | Henson ........................ 705/26 |
| 6,167,532 A | 12/2000 | Wisecup ...................... 714/23 |
| 6,170,065 B1 | 1/2001 | Kobata et al. ................. 714/7 |
| 6,182,212 B1 | 1/2001 | Atkins et al. ................... 713/1 |
| 6,182,275 B1 | 1/2001 | Beelitz et al. ................ 717/1 |
| 6,199,204 B1 | 3/2001 | Donohue ..................... 717/11 |
| 6,202,207 B1 | 3/2001 | Donohue ..................... 717/11 |
| 6,226,412 B1 | 5/2001 | Schwab ...................... 382/232 |
| 6,236,901 B1 | 5/2001 | Goss ........................... 700/95 |
| 6,247,126 B1 | 6/2001 | Beelitz et al. ................ 713/1 |
| 6,256,620 B1 | 7/2001 | Jawahar et al. ............... 707/2 |
| 6,263,215 B1 | 7/2001 | Patton et al. ................ 455/561 |
| 6,272,484 B1 | 8/2001 | Martin et al. ................. 707/1 |
| 6,279,109 B1 | 8/2001 | Brundridge ................... 713/2 |
| 6,279,125 B1 | 8/2001 | Klein .......................... 714/38 |
| 6,279,156 B1 | 8/2001 | Amberg et al. .............. 717/11 |
| 6,298,443 B1 | 10/2001 | Colligan et al. ............ 713/200 |
| 6,298,457 B1 | 10/2001 | Rachlin et al. .............. 714/49 |
| 6,331,936 B1 | 12/2001 | Hom et al. .................. 361/686 |
| 6,356,977 B2 | 3/2002 | Ofek et al. ................. 711/112 |

| | | |
|---|---|---|
| 6,367,035 B1 | 4/2002 | White .......................... 714/40 |
| 6,385,737 B1 | 5/2002 | Benignus et al. ............. 714/22 |
| 6,393,586 B1 | 5/2002 | Sloan et al. .................. 714/25 |
| 6,449,735 B1 | 9/2002 | Edwards et al. .............. 714/25 |

OTHER PUBLICATIONS

Compaq Computer Corporation, Press Release, "New PCs Offer Equipment, Colour and Personality; Compaq's Presario Range Opened Up for Customisation" at Internet>http://biz.yahoo.com/prnews/000719/compaq_new.html<, printed Jul. 24, 2000.

Compaq Computer Corporation, "Home and Home Office Computing, My Style" at internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.html<, Jul. 24, 2000.

Radio Shack, advertisement, p. 2, Aug. 20, 2000.

CNET.com, "IBM to Get Colorful with New Notebooks" at Internet >http://news.cnet.com/news/0–1003–200–296049.html?tag=st.cn.1fd2.<, printed Oct. 6, 1999.

3Com, "Palm Computer, News and Promotions" at Internet >http://www.palm.com/pr/holidaydebut.html<, printed Oct. 5, 1999.

@Backup Company, "169 Backup Company Information Page" at Internet, http://security.atbackup.com/VID101.3.819255.0/Company.htm, Printed Jun. 15, 1999.

@Backup Company, "169 Backup Company Frequently Asked Questions" at Internet, http://security.atbackup.com/VID101.3.819255.0/FAQ.asp, Printed Jun. 15, 1999.

@Backup Company, "Frequently Asked Questions: Technical" at Internet, http://security.atbackup.com/VID101.3.819255.0/Tech.asp, Printed Jun. 15, 1999.

@Backup Company, "Are You Protected" at Internet, http://security.atbackup.com/VID101.3.819255.0/Main.asp, Printed Jun. 15, 1999.

Exploring Windows NT "ZD Journals" at Internet >http://www.zdjournals.com/9802.ewn9821.html<, printed Oct. 18, 1999.

PCWorld News "Compaq Debuts Home PCs" at Internet >http://www2.pcworld.com.html<, printed Oct. 18, 1999.

"HP builds in Net button," at Internet <http://news.cnet.com/news/0–1003–202–316545.html>, printed Oct. 18, 1999.

"Packard Bell PCs provide state–of–the–art technology and complete user support" at <http://www.gadgetguru.com.html>, printed Oct. 18, 1999.

Wilson et al. "Knowledge based interface to manufacturing computer system", ACM pp. 1183–1189, 1988.

Green, "Component based software development: implications for documentation", ACM pp. 159–164, 1999.

Hall et al., "A cooperative approach to support software deployment using software dock", ACM ICSE pp. 174–183, 1999.

Wilson et al. "Knowledge based interface to manufacturing computer system", ACM pp. 1183–1189, 1988.

Green, "Component based software development: implications for documentation", ACM pp. 159–164, 1999.

Hall et al., "A cooperative approach to support software deployment using software dock", ACM ICSE pp. 174–183, 1999.

Great Britain Search Report 0019866.3 (016295.0328), Mar. 12, 2001.

* cited by examiner

SYSTEM AND METHOD FOR PROVIDING A COMPUTER SYSTEM WITH A DETACHABLE COMPONENT

TECHNICAL FIELD

The present disclosure relates in general to housing components for computing systems and, more particularly, to a system and method for providing a detachable component for a computer system.

BACKGROUND

While the operational capacity and functionality of computer systems remains extremely important, some computer users are beginning to request a more aesthetically pleasing, ergonomically sound, and individually customized computer system and components.

Conventional computer systems often have a rather unspectacular appearance. They tend to have drab coloration and contain ergonomically unfriendly designs such as poorly designed keyboards. Conventional techniques for remedying this situation are often inconvenient and costly. For example, if a user desires to ergonomically improve an existing computer system, the user may be forced to turn to a specialty device supplier such as a manufacturer of keyboards with integrated wrist rests. This approach usually results in the user's purchasing two components—the component included as a part of the initial computer system and the specialty component.

In addition, conventional techniques for improving and/or customizing the appearance of a computer system are limited. Recently, certain computer suppliers such as APPLE have begun providing more colorful computer systems. Unfortunately, the color selection appears to be limited. Moreover, there does not appear to be a simple way for a user to change the selected color. Therefore, if a user buys a computer system with an orange housing component, the user cannot easily replace the orange housing component with a housing component of a different color.

SUMMARY

In accordance with the present disclosure, a system and method for providing a detachable component are disclosed that provide significant advantages over prior developed systems. The disclosed embodiments allow a user to easily obtain a customized computing system.

According to one aspect of the present disclosure, a computer system incorporating teachings of the present disclosure may include a housing component at least partially defining an exterior surface of the computer system. The housing component may have at least one mounting finger, which may be, for example, a pin like protrusion or an elongated and flat extension. The mounting finger may extend from the housing component and be formed to define a locking shoulder. The system may also include a detachable component having a mounting tab. The mounting tab may interact with the locking shoulder to releasably couple the detachable component to the housing component.

According to another aspect of the present disclosure, a method for providing a detachable component may include accepting an order for a computer system (e.g., via the Internet) and providing a computer system to a user in response to the order. The provided computer system may have a housing component that at least partially defines an exterior surface of the computer system. This housing component may have at least one mounting finger that extends from the housing component and defines a locking shoulder. In addition, the provided computer system may include a detachable component with a mounting tab that releasably couples the detachable component to the housing component by interacting with the locking shoulder. In some embodiments, the user may choose to customize the detachable component by indicating a design to be incorporated into an outer surface of the detachable component. In addition, the user may indicate a desired color for the detachable component. These indications may be made at the time of ordering the computer system and, as such, the user may be provided with a computer system having customized detachable components.

The present invention provides several technical advantages. For example, by providing detachable components, a user may quickly and easily customize the appearance of a computer. Also, a manufacturer may more quickly and easily customize a computer system for each customer at the time of initial manufacture. Moreover, because the invention provides a way for users to select certain physical attributes of an ordered computer, users may avoid the inconvenience of replacing original computer system devices, such as supplied keyboards and monitors, with specialty devices.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Figure 1:
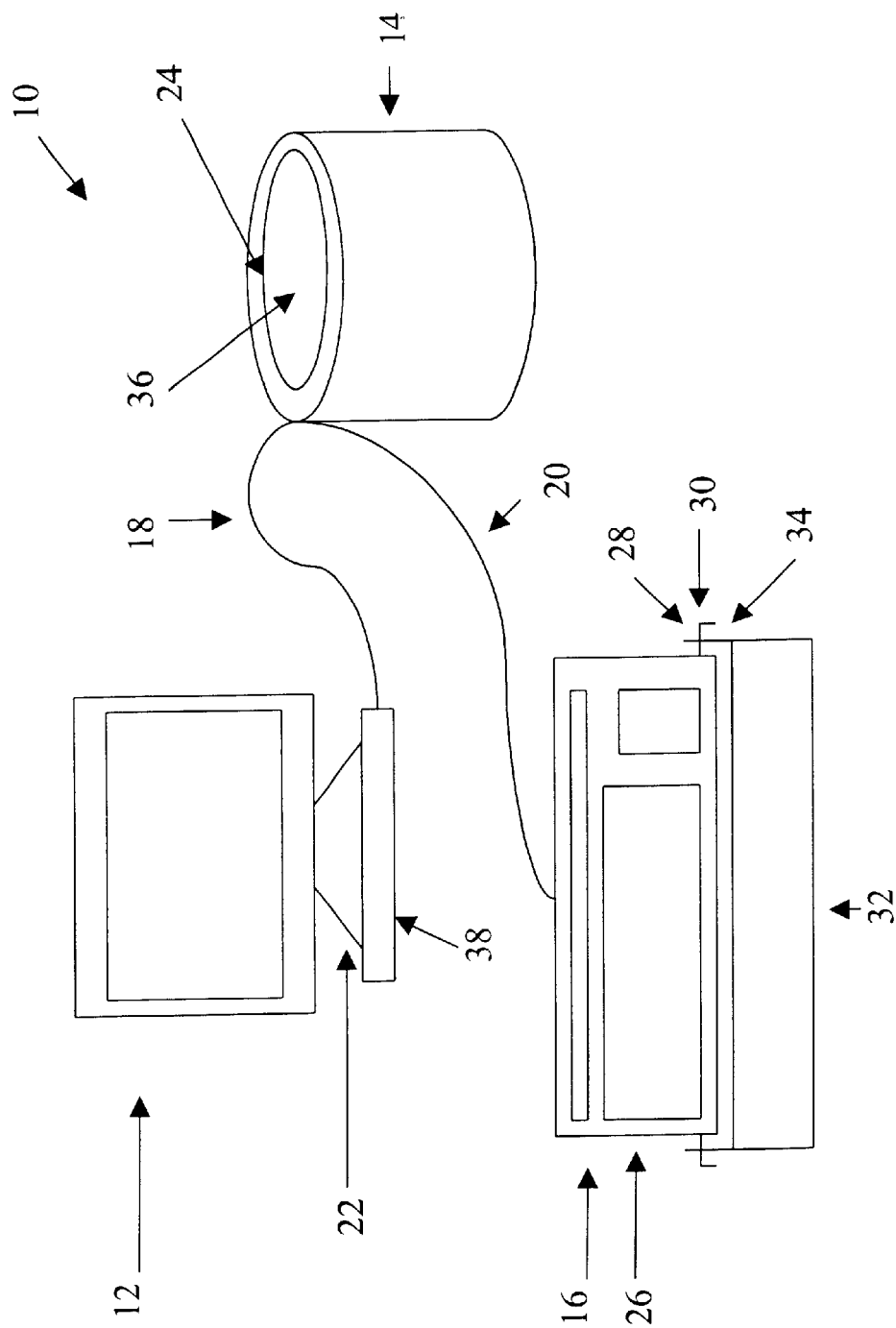
FIG. 1 depicts a computer system with housing components that incorporate teachings of the present disclosure.
Figure 2:
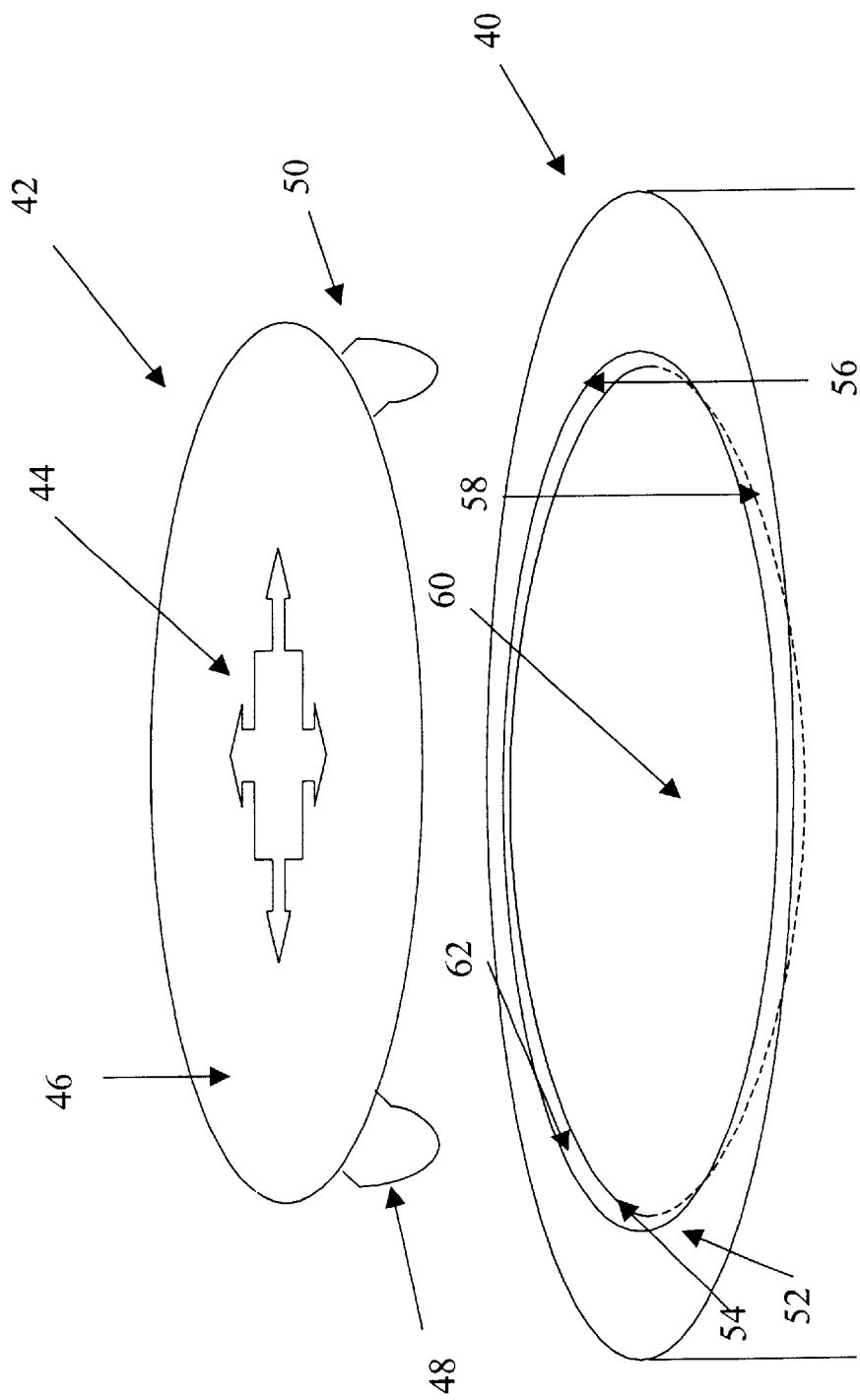
FIG. 2 depicts an exploded view of a computer system tower housing component and a detachable component, each of which incorporates teachings of the present disclosure.

Preferred embodiments and their advantages are best understood by reference to FIGS. 1 and 2, wherein like numbers are used to indicate like and corresponding parts.

FIG. 1 shows a computer system, representatively depicted at 10, incorporating teachings of the present disclosure. As depicted, computer system 10 includes three distinct computer system devices, monitor 12, tower 14, and keyboard 16. Though monitor 12, tower 14, and keyboard 16 make up computer system 10, other devices could also be included. For example, computer system 10 may include a printer or a zip drive. As depicted, monitor 12 and keyboard 16 are communicatively coupled to tower 14 via coupling cables 18 and 20, respectively.

Each of the depicted devices, monitor 12, tower 14, and keyboard 16, include housing components that make up at least a portion of their respective outer surfaces. For example, housing component 22 partially forms an exterior surface of monitor 12's base. Housing component 24 partially forms an exterior surface of tower 14's top, and housing component 26 partially forms an exterior surface of keyboard 16. Each of the depicted housing components 22, 24 and 26 have at least one mounting finger such as mounting finger 28 of housing component 26.

In the depiction of FIG. 1, mounting finger 28 extends from housing component 26 and defines a locking shoulder 30. In operation, a detachable component, such as wrist rest 32, may have a mounting tab 34. In some embodiments, mounting tab 34 may have a hole extending there through and may allow for releasably coupling wrist rest 32 to housing component 26 by interacting with mounting finger 28 and locking shoulder 30. The interaction of mounting tab 34 and mounting finger 28 may involve the extending of mounting finger 28 through a hole formed in mounting tab 34. This type of interaction may allow wrist rest 32 to be rotatably coupled to keyboard 16. As depicted in FIG. 1, mounting tab 34 may be located along the side of wrist rest 32 and, as such, allow for easy access and essentially unencumbered rotation.

Users of computing systems have been shown to make up to 20,000 repetitive hand motions a day at their keyboards. Occasionally, these users locate their keyboards at an improper height and force themselves to maintain a flattened hand profile when using the keyboard. Over an extended period of time, this flattened hand profile may lead to joint discomfort. In recent years, users of computing systems have begun to protect themselves by employing wrist rests (e.g., wrist rest 32).

The simplest and least expensive wrist rests for keyboards consist of narrow cushioned pads that sit in front of the keyboard. Unfortunately, these rests do not typically account for changes in keyboard angle that may result from raising and/or lowering the angle adjusting feet that are often included on the bottom of most keyboards. Moreover, typical wrist rests often fail to account for changes in keyboard location. Each time the keyboard is adjusted or relocated, the wrist rest must also be adjusted and/or relocated.

By allowing wrist rest 32 to releasably and rotatably couple with keyboard 16, many of the problems associated with conventional wrist rests may be reduced. In addition, the disclosed system may make it more likely a user will consistently take advantage of the benefits offered by a wrist rest.

In addition to wrist rest 32, FIG. 1 depicts two additional detachable components, monitor support ring 38 and tower top 36. Monitor support ring 38 and tower top 36 may be releasably coupled to housing components 22 and 24, respectively. In some embodiments, monitor support ring 38 and tower top 36 may be formed of extruded plastic. These extruded plastic parts may have colors different than the colors of housing components 22 and 24. In addition, monitor support ring 38 and tower top 36 may be at least partially metallic. For example, monitor support ring 38 and tower top 36 may be partially formed of brushed aluminum or some other finished metal. This difference in color and/or finish may make computer system 10 more visually striking.

In addition to an aesthetic advantage, tower top 36 may serve as an access panel for tower 14. By removing tower top 36, the interior of tower 14 may be accessed, allowing for servicing of tower 14 should such servicing be required. A more detailed depiction of a tower top (e.g., tower top 36) is provided in FIG. 2.

FIG. 2 depicts an exploded view of a computer system tower housing component 40 and a detachable component 42. As depicted, detachable component 42 is a tower top and includes a custom design 44 incorporated into its outer surface 46. Custom design 44, like a color difference between housing components, may allow a computer system (e.g., computer system 10 of FIG. 1) to be more visually striking. Because a user may be allowed to select and/or design the color scheme and custom design (e.g., custom design 44), the scheme and design may also allow for substantial customization of a computer system by its user.

As depicted in FIG. 2, detachable component 42 includes two mounting tabs 48 and 50 and two mounting fingers 52 and 54. Mounting fingers 52 and 54 each define respective shoulders 56 and 58. As depicted in FIG. 2, mounting fingers 52 and 54 extending into a central opening 60 in tower 40 and define a channel 62.

Unlike mounting tab 34 of FIG. 1, mounting tabs 48 and 50 are elongated and flat. Similarly, mounting fingers 52 and 54 are elongated and flat. In operation, mounting tabs 48 and 50 may interact with shoulders 56 and 58. The interaction may involve the placing of mounting tabs 48 and 50 within channel 60, the channel created between shoulders 56 and 58. This type of interaction may allow tower top 42 to be releasably coupled to tower 40.

Other types of tabs and fingers may be employed. For example, a detachable component may have a mounting tab formed to have a pin shape and a housing component may have a mounting finger formed to define a slot or hole sized to accept the pin shaped mounting tab. Although the present invention has been described in detail, it should be understood that various changes, substitutions and alterations can be made thereto without departing from the spirit and scope of the invention as defined by the appended claims.

What is claimed is:

1. A computer system, comprising:
   a housing component at least partially defining an exterior surface of at least a portion of the computer system;
   the housing component having at least one mounting finger;
   the mounting finger extending from the housing component and formed to define a locking shoulder;
   a first detachable component having at least one mounting tab for releasably coupling the first detachable component to the exterior surface of the housing component by interacting with the locking shoulder;
   the first detachable component having a first color and selected from the group consisting of a detachable keyboard component, a detachable monitor component, and a detachable tower component; and the housing component having a second color that is different from the first color.
   the detachable component having a first color, and
   the housing component having a second color that is different from the first color.

2. The system of claim 1, wherein the mounting tab comprises an elongated and flat extension.

3. The system of claim 1, wherein the first detachable component comprises a wrist rest.

4. The system of claim 1, wherein the first detachable component comprises extruded plastic.

5. The system of claim 1, wherein the detachable component comprises extruded plastic and the housing component comprises extruded plastic.

6. The system of claim 1 wherein the first detachable component comprises a monitor support ring.

7. The system of claim 1, wherein the first detachable component comprises a tower top.

8. The system of claim 1, wherein the computer system further comprises a keyboard and the housing component at least partially defines an exterior surface of the keyboard.

9. The system of claim 1 further comprising:
   the housing component further comprising a keyboard and a tower;

the first detachable component releasably coupled to the keyboard; and a second detachable component incorporating the second color and having at least one mounting tab, the second detachable component releasably coupled to the tower.

10. The system of claim 1 further comprising:

the housing component further comprising a keyboard and a monitor;

the first detachable component releasably coupled to the keyboard; and a second detachable component incorporating the second color and having at least one mounting tab, the second detachable component releasably coupled to the monitor.

11. The system of claim 1 further comprising:

the housing component further comprising a tower and a monitor;

the first detachable component releasably coupled to the tower; and a second detachable component incorporating the second color and having at least one mounting tab, the second detachable component releasably coupled to the monitor.

12. The system of claim 1 further comprising:

the housing component further comprising a keyboard, a monitor, and a tower;

the first detachable component releasably coupled to the keyboard;

a second detachable component incorporating the second color and having at least one mounting tab, the second detachable component releasably coupled to the monitor; and a third detachable component incorporating the second color and having at least one mounting tab, the third detachable component releasably coupled to the tower.

13. The system of claim 8, wherein the first detachable component comprises a wrist rest.

14. A method for providing a detachable component of a computer system, comprising the steps of:

forming a housing component that at least partially defines an exterior surface of a computer system such that the housing component has at least one mounting finger, the housing component having a first color;

forming the at least one mounting finger to extend from the housing component and to define a locking shoulder;

forming a detachable component such that the detachable component has a mounting tab and has a second color different than the first color, the detachable component selected from the group consisting of a detachable keyboard component, a detachable monitor component, and a detachable tower component; and releasably coupling the detachable component to the housing component by interacting the mounting tab with the locking shoulder.

15. The method of claim 14, wherein the step of forming a detachable component comprises forming a wrist rest and the step of forming a housing component comprises forming at least a portion of a keyboard.

16. The method of claim 14, further comprising the step of placing an order for the detachable component of the computer system via the Internet.

17. The method of claim 14 wherein the step of forming a detachable component further comprises forming a detachable component for releasably coupling to a housing component that at least partially defines the exterior surface of a keyboard.

18. The method of claim 14 wherein the step of forming a detachable component further comprises forming a detachable component for releasably coupling to a housing component that at least partially defines the exterior surface of a monitor.

19. The method of claim 14 wherein the step of forming a detachable component further comprises forming a detachable component for releasably coupling to a housing component that at least partially defines the exterior surface of a tower.

20. The method of claim 14 wherein the step of forming a detachable component further comprises:

forming a first detachable component for releasably coupling to a housing component that at least partially defines the exterior surface of a keyboard; and forming a second detachable component for releasably coupling to a housing component that at least partially defines the exterior surface of a tower.

21. The method of claim 15, wherein the wrist rest comprises extruded plastic and the portion of the keyboard comprises extruded plastic.

22. The method of claim 16, further comprising the step of choosing a desired second color for the detachable component.

23. The method of claim 22, further comprising the step of selecting a design to be incorporated into an outer surface of the detachable component.

24. A computer system, comprising:

a housing component at least partially defining an exterior surface of at least a portion of the computer system;

a first detachable component operable to releasably couple to the housing component and the first detachable component selected from the group consisting of a detachable keyboard component, a detachable monitor component, and a detachable tower component;

the housing component having a first aesthetic characteristic; and the first detachable component having a second aesthetic characteristic that is different than the first aesthetic characteristic.

25. The system of claim 24 wherein:

the first aesthetic characteristic comprises a first color; and the second aesthetic characteristic comprises a second color different than the first color.

26. The system of claim 24 wherein the first aesthetic characteristic comprises a selectable design.

27. The system of claim 24 wherein the first detachable component comprises a wrist rest.

28. The system of claim 24 wherein the first detachable component comprises extruded plastic.

29. The system of claim 24 wherein the second aesthetic characteristic further comprises a user selectable aesthetic characteristic.

30. The system of claim 24 further comprising:

the housing component at least partially defining an exterior surface of a keyboard; and the first detachable component releasably coupled to the keyboard.

31. The system of claim 24 further comprising:

the housing component at least partially defining an exterior surface of a tower; and the first detachable component releasably coupled to the tower.

32. The system of claim 24 further comprising:

the housing component at least partially defining an exterior surface of a monitor; and the first detachable component releasably coupled to the monitor.

33. The system of claim 24 wherein the first aesthetic characteristic comprises a first texture and the second aesthetic characteristic comprises a second texture different from the first texture.

34. The system of claim 30 wherein the first aesthetic characteristic comprises a first color and the second aesthetic characteristic comprises a second color different than the first color.

35. The system of claim 31 wherein the first aesthetic characteristic comprises a first color and the second aesthetic characteristic comprises a second color different than the first color.

36. The system of claim 32 wherein the first aesthetic characteristic comprises a first color and the second aesthetic characteristic comprises a second color different from the first color.

37. A method of providing a computer system having a selected aesthetic characteristic, comprising:

(a) providing a plurality of computer components having at least two housing components that define at least a portion of the outer surface of two computer components;

(b) providing at least two detachable components having at least one selected aesthetic characteristic, the atleast two detachable components selected from the group consisting of a detachable keyboard component, a detachable monitor component and a detachable tower component;

(c) attaching each of the at least two detachable components to a corresponding housing component to create a computer system having multiple components with a selected aesthetic characteristic.

38. The method of claim 37 wherein:

step (a) further comprises providing a keyboard and a monitor; and step (b) further comprises providing a detachable keyboard component and a monitor ring.

39. The method of claim 37 wherein:

step (a) further comprises providing a keyboard and a tower; and step (b) further comprises providing a detachable keyboard component and a detachable tower component.

40. The method of claim 37 wherein:

step (a) further comprises providing a monitor, and a tower; and step (b) further comprises providing a monitor ring and a detachable tower component.

41. The method of claim 37 wherein the at least two detachable components comprise at least two accent color snap-on components.

42. The method of claim 37 wherein step (c) further comprises snapping the at least two detachable componets to a corresponding housing component.

43. The method of claim 37 wherein step (c) further comprises:

snapping a detachable keyboard component into a keyboard housing;

snapping a monitor ring into a monitor housing; and snapping a detachable tower component into a tower.

44. The method of claim 37 wherein step (c) further comprises:

snapping a monitor ring into a monitor housing; and snapping a detachable tower component into a tower.

45. The method of claim 37 wherein step (c) further comprises:

snapping a detachable keyboard component into a keyboard housing; and snapping a monitor ring into a monitor housing.

46. The method of claim 37 wherein step (c) further comprises:

snapping a detachable keyboard component into a keyboard housing; and snapping a detachable tower component into a tower.

* * * * *